(12) United States Patent
Kelley et al.

(10) Patent No.: US 12,458,590 B2
(45) Date of Patent: Nov. 4, 2025

(54) DEVICE AND METHOD FOR TREATING CANCER

(71) Applicants: Jill Kelley, Tampa, FL (US); Scott T. Kelley, Tampa, FL (US)

(72) Inventors: Jill Kelley, Tampa, FL (US); Scott T. Kelley, Tampa, FL (US)

(73) Assignee: Jill Kelley, Tampa, FL (US)

( * ) Notice: Subject to any disclaimer, the term of this patent is extended or adjusted under 35 U.S.C. 154(b) by 0 days.

(21) Appl. No.: 18/607,237

(22) Filed: Mar. 15, 2024

(65) Prior Publication Data

US 2024/0307297 A1    Sep. 19, 2024

Related U.S. Application Data

(60) Provisional application No. 63/452,197, filed on Mar. 15, 2023.

(51) Int. Cl.
| | |
|---|---|
| *A61K 9/00* | (2006.01) |
| *A61K 35/37* | (2015.01) |
| *A61K 38/18* | (2006.01) |
| *A61K 45/06* | (2006.01) |

(52) U.S. Cl.
CPC ............ *A61K 9/0024* (2013.01); *A61K 35/37* (2013.01); *A61K 38/1866* (2013.01); *A61K 45/06* (2013.01)

(58) Field of Classification Search
CPC .............................. A61B 17/11; A61K 9/0024
See application file for complete search history.

(56) References Cited

U.S. PATENT DOCUMENTS

| | | |
|---|---|---|
| 1,470,707 A | 10/1923 | Bates |
| 3,254,651 A | 6/1966 | Collito |
| 5,064,057 A | 11/1991 | Iwatsuki et al. |
| 5,180,392 A | 1/1993 | Skeie et al. |
| 5,921,995 A | 7/1999 | Kleshinski |
| 8,092,472 B2 | 1/2012 | Cerier |
| 8,663,086 B2 | 3/2014 | Duncan et al. |
| 8,894,699 B2 | 11/2014 | Kelley |
| 9,649,185 B2 * | 5/2017 | Bangera ................. A61K 45/06 |
| 9,827,135 B2 | 11/2017 | Fong et al. |
| 11,896,229 B2 | 2/2024 | Pic et al. |
| 2004/0176751 A1 | 9/2004 | Weitzner et al. |
| 2004/0254595 A1 | 12/2004 | Richard et al. |
| 2006/0271104 A1 | 11/2006 | Viola et al. |
| 2007/0100420 A1 | 5/2007 | Kavanagh et al. |
| 2008/0132923 A1 | 6/2008 | Fowler |
| 2009/0281634 A1 | 11/2009 | Abell et al. |
| 2010/0010517 A1 | 1/2010 | Stopek et al. |
| 2010/0010518 A1 | 1/2010 | Stopek et al. |
| 2010/0023132 A1 | 1/2010 | Imran et al. |
| 2011/0098732 A1 | 4/2011 | Jacobs |
| 2011/0319902 A1 | 12/2011 | Epstein |
| 2017/0151049 A1 * | 6/2017 | La Francesca ........... A61F 2/82 |
| 2018/0353653 A1 | 12/2018 | Reid et al. |
| 2021/0236131 A1 | 8/2021 | Anderson et al. |
| 2023/0087452 A1 | 3/2023 | Gilmartin et al. |
| 2023/0255722 A1 | 8/2023 | Saenz Villalobos et al. |

OTHER PUBLICATIONS

Symer et al (Management of the malignant colorectal polyp; Current Problems in Surgery, 59, 101124) (Year: 2022).*
International Search Report dated Sep. 4, 2008 for PCT/US2008/059489.

* cited by examiner

*Primary Examiner* — Micah Paul Young
(74) *Attorney, Agent, or Firm* — Rock IP, PLLC

(57) ABSTRACT

Method and device to treat cancer after surgery in the gastrointestinal tract. The device can be used in a method comprising of removing cancerous cells from a cancerous site on a tissue or organ of a patient, positioning a biodegradable device having a cancer treatment agent to cover the cancerous site, securing the biodegradable device to the cancerous site such that an outer wall of the device extends across the cancerous site, and leaving the biodegradable device at the cancerous site for treatment of microcells left adjacent to the cancerous site.

7 Claims, 3 Drawing Sheets

DEVICE AND METHOD FOR TREATING CANCER

RELATED APPLICATIONS

The present application claims the benefit of the filing date of U.S. Provisional Patent Application No. 63/452,197, filed Mar. 15, 2023, the disclosures of which are hereby incorporated by reference herein in its entirety.

FIELD OF INVENTION

This application is directed to a device for insertion into or over body lumens for treating cancer and methods of treating cancer using the device.

BACKGROUND OF INVENTION

The gastrointestinal (GI) tract extends from the esophagus to the anus and serves many functions, including nutrition, hydration, and disease prevention. Resection of a portion of the GI tract, such as esophagus, stomach, small intestine, large intestine or colon, is performed on a patient under general anesthesia. An incision is typically made in the abdomen, chest or neck and a diseased portion is removed. The healthy ends that remain are sewn or stapled together and the incision is closed through the procedure known as anastomosis.

Gastrointestinal doctors use colonoscopy or endoscopy procedures to treat the colon or any GI tract lumen to remove cancerous or precancerous polyps. Such procedures include polypectomy or endoscopic mucosal resection (EMR) to remove such sections of cancerous or precancerous tissue. However, there is still a chance of some cancer cells remaining which can proliferate and create risks to the patients.

It would be advantageous to provide a device for use with surgical procedures for early colon or other GI tract cancers removed by colonoscopy and also early cancers removed via endoscopy to reduce the risk of cancerous cell growth and to place a biodegradable stent or patch in the area(s) that elutes chemotherapy to kill the remaining microscopic cells. Additionally, it would be advantageous to protect the ability to have the stent or patch elute other substances like healing factors (VEG-F, antibiotics, growth factors, and the like but not limited to).

SUMMARY OF THE INVENTION

In one aspect, the present disclosure is directed to a method of treating cancer which is minimally invasive so it avoids the need for major surgery. It further reduces the need for radiation. The device is placed within the body lumen and carries a chemotherapeutic agent. It is left in the lumen so the chemotherapeutic agent can shrink or destroy the tumor. It is biodegradable so it does not need to be removed.

Gastrointestinal doctors use colonoscopy or endoscopy procedures to treat the colon or any GI tract lumen to remove cancerous or precancerous polyps. Such procedures include polypectomy or endoscopic mucosal resection (EMR) to remove such sections of cancerous or precancerous tissue. However, there is still a chance of some cancer cells remaining which can proliferate and create risks to the patients. The device is for use with surgical procedures for early colon or other GI tract cancers removed by colonoscopy and also early cancers removed via endoscopy to reduce the risk of cancerous cell growth. Thus, the device can be used by gastrointestinal (GI) doctors during colonoscopy and endoscopy procedures to treat the colon or any GI tract lumen at the site of removed cancerous or precancerous polyps to reducing the incidence of cancerous cell growth. In short, when a G.I. doctor does a colonoscopy or an endoscopy on a patient to take out a polyp, the doctor then can slide the biodegradable stent that has drug eluting therapeutic agent(s) to treat any micro cells left from where the polyp was removed, e.g., treating micro cancers during EMR.

The biodegradable stent of the present disclosure thus in accordance with some embodiments is placed after polypectomy or endoscopic mucosal resection (EMR) for early colon cancers removed by colonoscopy and/or early cancers removed via endoscopy to treat the colon or any GI tract lumen at the site of removed cancerous or precancerous polyps to reduce the incidence of cancerous cell growth. In such embodiments, when a GI doctor performs a colonoscopy or an endoscopy on a patient to take out a polyp, the doctor will subsequently insert the biodegradable device that has drug eluting therapeutic products to treat any micro cells left from where the polyp was removed. Thus, the device can treat micro cancers during EMR or other GI surgical procedures.

In one aspect of the present disclosure, a device in the form of a biodegradable tubular structure to treat cancer in the GI tract is provided including a) positioning a tubular straw like device in a lumen of the body region; and b) securing the device to the intestine utilizing an adhesive, the device having a treatment substance adhered thereto such as a chemotherapeutic agent.

The adhesive can be utilized to attach the tubular structure to the body lumen and the adhesive can also provide a sealant. The tubular device is in the form of a straw with a thin wall and a lumen extending therethrough, and has an open proximal and distal end to enable flow therethrough. The tubular device in some embodiments has a ribbed rim top or can be a colon-shaped device. (Top referring to the portion/region closer to the head of the patient).

The tubular device can be made of tissue engineered material, e.g., from tissue generated organs.

In accordance with another aspect of the present disclosure a method to support a tissue region during treatment is provided comprising the steps of a) positioning a tubular straw like device across a region of the body blocked by a tumor; and b) securing the device to the intestine utilizing an adhesive, the device including a chemotherapeutic agent adhered thereto to shrink the tumor.

The foregoing methods utilize in some embodiments a tubular device having an enlarged rim providing a diameter larger than other regions of the device. The rim is at the top portion of the device and in some embodiments provides a radial force against the tissue, e.g., colon wall, to help secure the device in place. The device can be held in place by an adhesive. In preferred embodiments, the adhesive utilized has a dual function: adhering the device to the tissue, e.g., luminal wall, and providing a seal to prevent unwanted flow.

In accordance with another aspect of the present disclosure, a device to treat cancer in the GI tract is provided, the device comprising a tubular straw like body and having a rim, the device composed of a tissue engineered material and held in place at the rim by an adhesive.

In accordance with another aspect of the present disclosure, a device to treat cancer in a luminal region of a body of a patient is provided, the device comprising a tubular straw like configuration have an outer wall and an inner wall defining a lumen extending through the device, the device attachable to the region via adhesive.

In accordance with another aspect of the present disclosure. a method to treat cancer in the gastrointestinal tract of a patient is provided including a) positioning a biodegradable tubular straw like device in a lumen of a first intestine portion, the tubular device formed as one piece and having a first end opening, a second end opening and a lumen extending through an entire length of the device; and b) attaching a second intestine portion to the first intestine portion to form an anastomotic site, the device extending into a lumen of the second intestine portion; and c) securing the device to the first intestine portion utilizing an adhesive such that an outer wall of the device extends across the anastomotic site, the device including a treatment or healing substance adhered thereto to treat cancerous cells at or adjacent the anastomotic site.

In accordance with another aspect of the present disclosure, a method to treat cancer in the gastrointestinal tract of a patient is provided, the method comprising a) positioning a biodegradable tubular straw like device in a lumen of a portion of the gastrointestinal tract where a polyp has been removed, the device having a rim having an enlarged diameter to provide a radial force against the intestine, the device having a chemotherapeutic agent adhered thereto and b) securing the device adjacent the site of polyp removal via adhesive, the rim preventing backflow past the rim.

In accordance with another aspect of the present disclosure, a method to treat cancer in the gastrointestinal tract of a patient is provided comprising a) removing a polyp from a wall of a lumen of a portion of the intestinal tract; b) positioning a biodegradable tubular straw like device in the lumen of the portion of the gastrointestinal tract at a site where the polyp was removed, the device having a cancer treatment agent adhered thereto; c) securing the device adjacent the site of polyp removal via adhesive; and d) leaving the device in the lumen for treatment of microcells potentially left adjacent the site of polyp removal.

In accordance with another aspect of the present disclosure, a device to treat cancer within the gastrointestinal tract of a patient is provided, the device comprising a tubular straw like body having a top portion, a bottom portion, and an intermediate portion between the top portion and the bottom portion. The device is configured to be inserted into a lumen of a first portion within the gastrointestinal tract, the device having a lumen extending from the top portion to the bottom portion and a rim at the edge of the top portion, the rim having an enlarged diameter. The device is composed of a tissue engineered material and held in place at the rim by an adhesive.

BRIEF DESCRIPTION OF THE DRAWINGS

So that those having ordinary skill in the art to which the subject invention appertains will more readily understand how to make and use the apparatus (device) disclosed herein, preferred embodiments thereof will be described in detail hereinbelow with reference to the drawings, wherein:

FIGS. 5 and 6 are perspective views of an alternate embodiment of the device of the present disclosure placed over the first and second intestine portions, wherein;

FIG. 5 shows the tubular device inserted over the first intestine portion, the second intestine portion not yet attached; and FIG. 6 shows the tubular device positioned over the first and second intestine portions and the second intestine portion placed in apposition (abutment) with the first intestine portion;

DETAILED DESCRIPTION OF THE INVENTION

Figure 1:
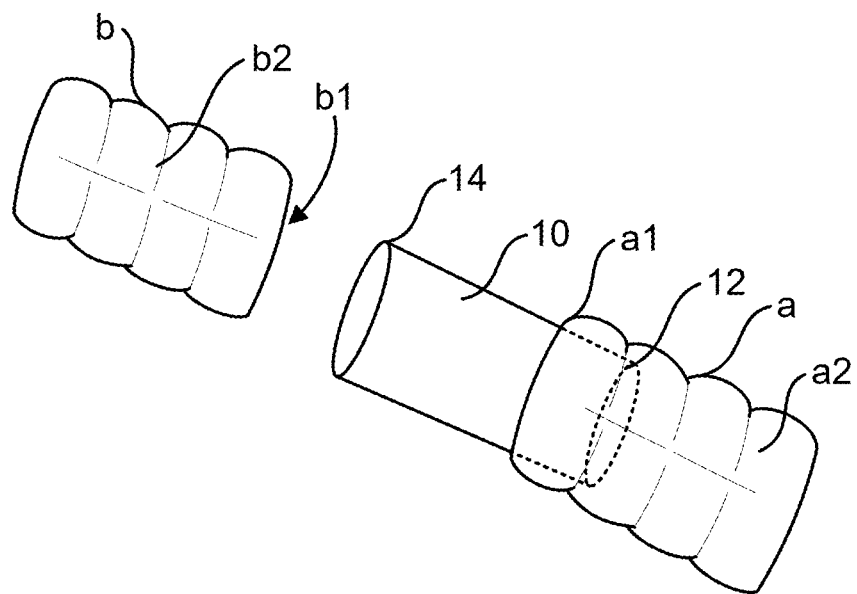
FIG. 1 is a perspective view of an embodiment of the tubular device of the present disclosure shown inserted into a lumen of a first intestine portion (section), the second intestine portion (section) not yet attached.

According to aspects of the present disclosure, devices disclosed are in the form of a covered stent providing a scaffold inserted between or into the lumen ends to be anastomosed to provide stability and/or structure to the anastomosed lumen.

The device of the present disclosure provides a tubular structure, also referred to herein as a straw-like structure. The tubular straw-like structure is impermeable and preferably composed of a biodegradable material which will degrade within the body after a period of time. The tubular structure in some embodiments provides structure and/or stability to the body lumens. The tubular structure has a thin wall and a lumen extending therethrough, and has an open top and bottom end. "Top" and "bottom" as used herein refer to orientation wherein top is closer to the patient's head and bottom is further from the patient's head. Also, top and bottom as used herein relates to direction of flow of body fluids or substances, e.g., the stool passes from the top to bottom. Proximal as used herein can also refer to the top portion and distal refer to the bottom portion, also relating to flow/passage.

The tubular structure can be formed of one piece which provides the advantages of ease of manufacture and more flexibility as opposed to the use of covered stents which need to have an impermeable cover attached to the inner structure.

In some embodiments, the tubular device is used with anastomosis of two body lumens, such as two portions of the intestine, after removal of a cancerous or precancerous section of the colon. In other embodiments, the tubular device is used in an area where a cancerous or precancerous polyp has been removed. In these embodiments, the device has a chemotherapeutic or other treatment substance adhered thereto to deliver the substance to treat, e.g., shrink or destroy, any microcells left at the removed site. By being biodegradable, the device does not need to be removed in a subsequent surgery after treatment. Various other clinical applications of the tubular straw-like structure are also contemplated.

The biodegradable stent in some embodiments is placed after polypectomy or endoscopic mucosal resection (EMR) for early colon cancers removed by colonoscopy and also early cancers removed via endoscopy. Gastrointestinal (GI) doctors can use the device during colonoscopy and endoscopy procedures to treat the colon or any GI tract lumen at the site of removed cancerous or precancerous polyps to reduce the incidence of cancerous cell growth. In other words, when a GI doctor does a colonoscopy or an endoscopy on a patient to take out a polyp, they will subsequently insert the biodegradable device that has drug eluting therapeutic products to treat any micro cells left from where the polyp was removed.

Thus, the device can treat micro cancers during EMR or other GI surgical procedures.

The device can be left in place after endoscopic removal of a tumor to treat microscopic disease that may be left behind, like a polypectomy procedure where the polyp has cancerous or pre-cancerous cells near the polypectomy "margin" then the biodegradable device impregnated with a chemotherapeutic agent can be left in place to treat the microscopic disease.

In the present disclosure, biodegradable stent or patch is placed in the area(s) that elutes chemotherapy to kill the remaining microscopic cells. Additionally, stent or patch elutes other substances like healing factors (VEG-F, antibiotics, growth factors, and the like but not limited to).

Figure 2:
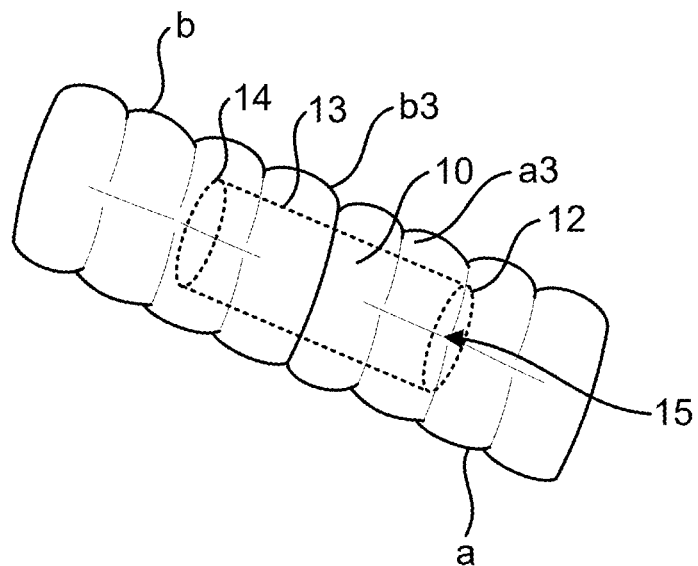
FIG. 2 is a perspective view similar to FIG. 1 showing the tubular device inserted into the lumen of the second intestine portion and second intestine portion placed in apposition (abutment) with the first intestine portion.

Referring now to the drawings and particular embodiments of the present disclosure, wherein like reference numerals identify similar structural features of the devices throughout the several views, the device (stent) of a first embodiment is designated generally by reference numeral 10. Device 10 is in the form of a biodegradable straw and has a first open end 12 and a second opposite open end 14. The device can have the dimensions set forth above. First end 12 is dimensioned, i.e., outer dimension, to be inserted into opening a1 and into lumen a2 of first intestine portion a and second end 14 is dimensioned, i.e., outer dimension, to be inserted into opening b1 and into lumen b2 of second intestine portion b. Thus, the inner dimension (ID) of the lumen is greater than the outer diameter (OD) of the device 10. FIG. 1 illustrates first end 12 of device 10 inserted into lumen portion a and not yet inserted into lumen portion b; FIG. 2 illustrates device 10 inserted into both intestine portions a, b and the portions a, b approximated and in contact (abutment) for anastomosis. The inner diameter (inner lumen 15) of device 10 is dimensioned to accommodate body fluid flow and maintain unobstructed passage through the intestine. Note the drawings of FIGS. 1-9 show a large space between the intestine wall and device for clarity since in application the device OD would be close to the lumen ID as explained below.

In use, a lumen, such as a colon, is separated and a diseased portion is removed. After removal, the surgeon inserts one end of the tubular device 10 into one end of the separated lumen (or the separated lumen end is placed over the device 10). The second end of the tubular device 10 is then inserted into the other lumen (or the lumen end is placed over the device 10), and the two lumens are attached to each other by various methods such as suturing, stapling and/or use of an adhesive to create an anastomotic site.

The tubular device 10 inserted after the anastomosis acts as a cancer treatment device.

Apparatus and methods of the present disclosure can be utilized for anastomosis in various lumens of the body and the intestine in FIGS. 1 and 2 is provided by way of example. Other lumens include for example lumens located in the gastrointestinal tract, the urinary tract, the cardiovascular system, the biliary tract, pancreatic duct and the genitourinary tract. Suitable anastomosis sites may include for example the intestines, esophagus, stomach, bile ducts, pancreas, pancreatic duct, ureter, pancreas and urethra. Other body lumens/tubular structures and sites are also contemplated. Uses of the device other than for anastomosis are also contemplated.

In one embodiment, resection of a portion of the GI tract such as the esophagus, stomach, colon, small intestine or large intestine may be performed on a patient under general anesthesia to remove troublesome portions of luminal tissue, such as cancerous tissue. After resection, the separated lumen ends may be anastomosed, and device 10, with its treatment agent(s) adhered thereto, positioned in the luminal tissue.

Device 10 (as well as devices 20 and 30 discussed below) is shown symmetrically shaped but asymmetrical shapes, such as the ends being of different sizes or configurations, are also contemplated as are shapes other than the cylindrical shape shown, e.g., funnel shaped, non-circular cross-section, etc. Additionally, the device may be configured for custom sizing and/or shaping to conform to the contours of the lumen.

The device is preferably non-expandable such that its transverse dimension is the same during insertion as well as during placement. However, in alternate embodiments, the device is collapsible/expandable such that it is inserted in a reduced diameter configuration and expands to a larger diameter placement configuration. Expansion can be for example by an inflatable balloon or by a phase change such as with shape memory polymeric materials.

The device can be configured to be of a size (or expandable to a size in embodiments where the device expands) to make contact with the surrounding luminal tissue, i.e., the internal wall of the lumen, for attachment and/or support. For example, where adhesive is applied to at least part of the external surface of the device and/or at least part of the internal surface of the luminal tissue, a balloon may provide a mechanism for holding the device 10 in place while the adhesive sets.

Device 10 comprises a biocompatible, biodegradable and/or bioabsorbable material. Once in place, it may disintegrate/degrade/resorb over time (after sufficient treatment, e.g., application of chemotherapeutic or other cancer treating agents), and either become absorbed into or pass through the body so invasive mechanical removal is not necessary.

The tubular structure preferably provides a continuous outer wall (without openings) to provide a sealed structure along its length.

In some embodiments, the device can be composed of tissue engineered material. For example, the device can be made of cells of an organ such as colon cells.

Figure 9:
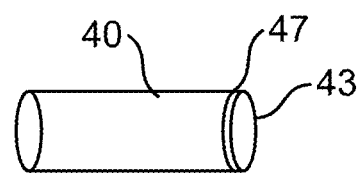
FIG. 9 is a perspective view of an alternate embodiment of the tubular device having a thickened rim portion.

In some embodiments, the device can have a ribbed rim 42 to providing a holding force to hold the device against the tissue/organ, e.g., colon, as shown in FIG. 9. The rim 42 of device 40 can create a radial force against the body lumen, e.g., colon, to help hold it in place. The rim, being at the top, i.e., closer to the head, could also provide a seal to prevent passage of stool behind it. An adhesive can be placed on the tip of the rim of the device to help hold it in place and provide a seal. The top of the device can in some embodiments be thicker to provide additional support as shown for example in FIG. 9. Thus, the device of FIG. 9 serves three functions: a) securement in place; b) sealing the body lumen from unwanted passage proximal of the rim 42 and c) applying a treatment agent to lumen wall. In this embodiment, in some instances, the adhesive need only be applied to the rim portion (top), although adhesive may be applied to other regions of the device. The adhesive 43 can be applied around the periphery (circumference) as shown in FIG. 9. The adhesive around the rim periphery can provide the sole adhesive or alternatively adhesive could be provided on other regions.

Figure 8:
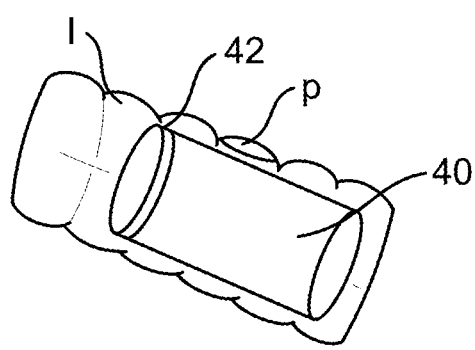
FIG. 8 is a perspective view showing the tubular device inserted into a body lumen to apply a chemotherapeutic agent to tissue adjacent the site of polyp removal.

FIG. 8 illustrates the device 40 of FIG. 9, having an enlarged rim 42, positioned in the intestine at the site p adjacent the area of removal of a polyp. The device 40 has a chemotherapeutic agent adhered thereto to treat cancer at the site p.

The device 10 can include an adhesive applied thereon during the surgical procedure. The adhesive can be applied to a portion or to the entire external surface during the surgery and then the device inserted into intestinal portions as shown in FIG. 2 wherein the adhesive surface comes into contact with the inner wall of the lumen to adhesively attach the device 10 within the lumen. Note the drawings show the device not in contact with the inner wall of the lumen for clarity, it being understood, that during use the device can be configured to be of a size such that at least portions of the outer wall of the device are in contact/abutment with the inner wall of the lumen so the adhesive is pressed between the outer wall 13 of device 10 and the inner wall a3, b3 of the lumens of intestine portions a, b.

Figure 3:
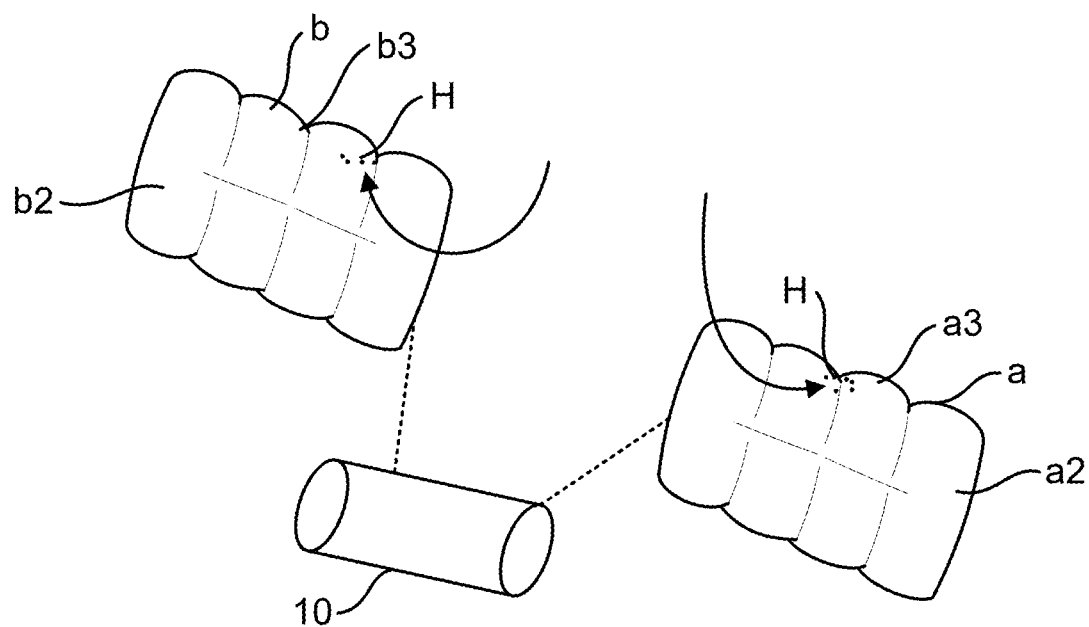
FIG. 3 illustrates an alternate embodiment wherein the adhesive is applied to the internal wall of the lumens of the intestinal portions prior to insertion of the tubular device of FIG. 1.
Figure 4:
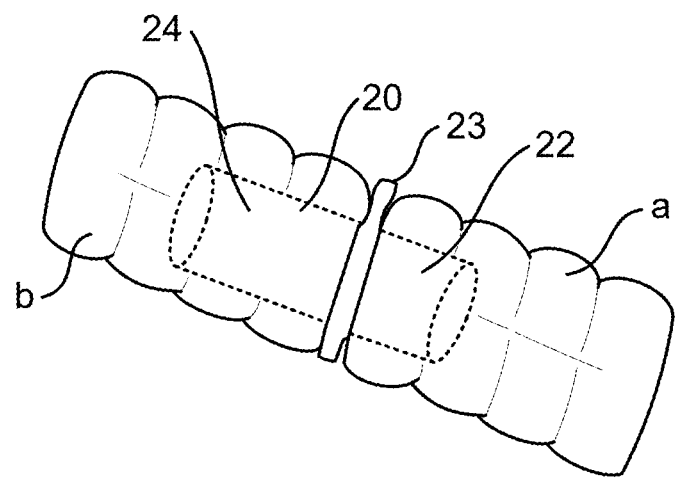
FIG. 4 is a perspective view of an alternate embodiment of the tubular device of the present disclosure having an enlarged region to bridge the gap between the first and second intestinal portions which are not in abutment.

In the alternate embodiment of FIG. 3, the adhesive H is applied solely to the inner wall a3, b3 of intestine portions a, b as shown schematically by the arrows. Device 10, without any adhesive applied thereto, would then be inserted into the lumens a2, b2 after such application of adhesive to adhere to the inner walls a3, b3.

The adhesive, in alternate embodiments, could be applied to device 10 prior to the surgery rather than during the surgery and activated during the procedure. That is, the adhesive could be applied to the external wall of the device 10 prior to the surgical procedure and then activated, e.g., via warming by body temperature, or by another device, to release the adhesive to provide adherence of the device 10 to the lumen walls a3, b3.

In the embodiment of FIG. 2, the device is inserted into the lumens of the two separated intestine portions and the two portions/lumens are brought into contact/abutment for the anastomosis. In the alternate embodiment of FIG. 4, device 20 has an enlarged diameter region 23 between ends 22 and 24 at a midway portion between the two ends or alternatively closer to one of the ends. The enlarged region 23 bridges the gap between intestinal portions a, b, i.e., the portions a, b are in abutment with the enlarged region 23, on opposing sides. In some embodiments, the enlarged region 23 can have an outer diameter substantially equal to the outer diameter of portions a, b, although other outer diameters are also contemplated. In this embodiment, adhesive could also be applied to enlarged region 23 and/or sections a, b where they abut. The enlarged region as well as other regions of the device can include a treatment agent for treating cancer. The ends 22 and 24 are within the lumens of portions a, b and thus have a smaller OD than the ID of portions a, b. Device 20 can be made of the same material, can be of various symmetrical and asymmetrical forms, and function to provide structure in the same manner as device 10.

Figure 5:
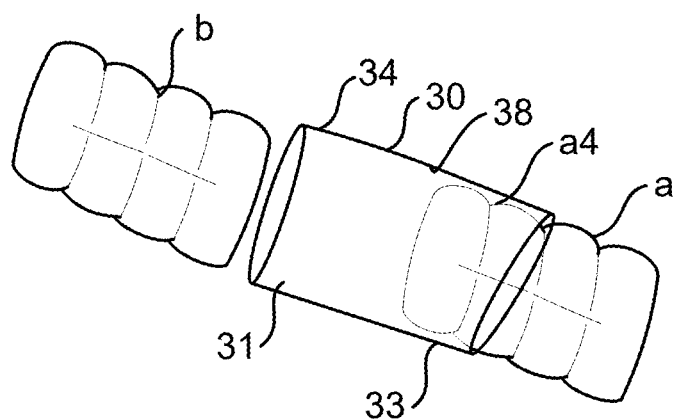
Figure 6:
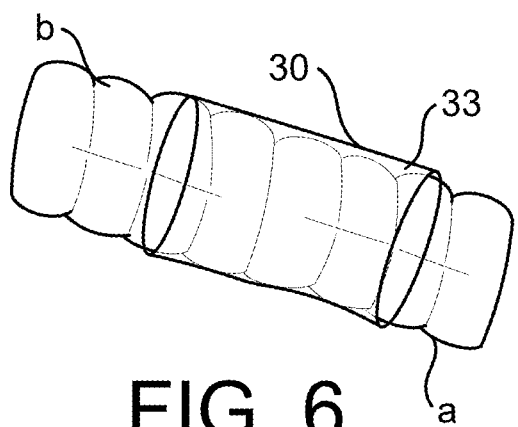
Figure 7:
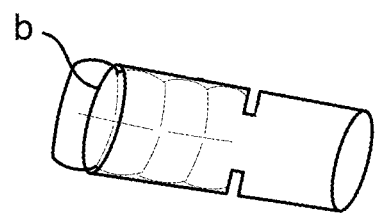
FIG. 7 is a perspective view of an alternate embodiment of the tubular device of the present disclosure having an inward extension.

In the alternate embodiment of FIGS. 5 and 6, device 10 is dimensioned so that it is placed over the external wall of the intestine sections a, b rather than inside the lumen of portions (sections) a, b as in FIG. 1. More specifically, device 30 has a first end 33 and a second opposite end 34 and a wall 38. The device 30 is shown in FIG. 5 placed over the outer wall a4 of intestine.

What is claimed is:

1. A method to treat cancer in the gastrointestinal tract of a patient, the method comprising:
    removing cancerous cells from a cancerous site on a tissue or organ of a patient;
    positioning a biodegradable device having a cancer treatment agent to cover the cancerous site;
    securing the biodegradable device to the cancerous site such that an outer wall of the device extends across the cancerous site; and
    leaving the biodegradable device at the cancerous site for treatment of microcells left adjacent to the cancerous site,
    wherein the cancer treatment agent is a healing agent to treat the cancerous cells at the cancerous site, the healing agent comprising VEG-F.

2. The method of claim 1, wherein the cancerous cells include polyps.

3. The method of claim 1, wherein cancer treatment agent further comprises a chemotherapeutic agent to treat the cancerous cells at the cancerous site.

4. The method of claim 1, wherein the biodegradable device is formed of tissue engineered materials.

5. The method of claim 1, wherein the biodegradable device is a biodegradable tubular straw.

6. The method of claim 1, wherein the biodegradable device is a biodegradable patch.

7. The method of claim 1, wherein the biodegradable device is secured via adhesive.

* * * * *